Oct. 17, 1933.         O. L. LAWSON         1,930,482
CLUTCH
Filed Oct. 20, 1931

INVENTOR
Oscar L. Lawson
By his Attorney
Harlow B.

Patented Oct. 17, 1933

1,930,482

UNITED STATES PATENT OFFICE 1,930,482

CLUTCH

Oscar L. Lawson, Lynn, Mass., assignor to United Shoe Machinery Corporation, Paterson, N. J., a corporation of New Jersey Application October 20, 1931. Serial No. 569,943

4 Claims. (Cl. 192—81)

This invention relates to clutches and is herein illustrated as embodied in a friction clutch of the contractible coil type.

Clutches in which a coil is contracted about a hub or drum to connect a driving member with a driven member present certain difficulties due to the fact that the coil should engage the hub firmly and uniformly at all points while at the same time the force applied to the coil to contract it should at no time be sufficient to break the coil. The general object of the present invention is to provide a clutch of the coil type in which these difficulties are avoided, the invention consisting of certain details of construction and combinations of parts which will be described as embodied in an illustrated device and pointed out in the appended claims.

Figure 1:
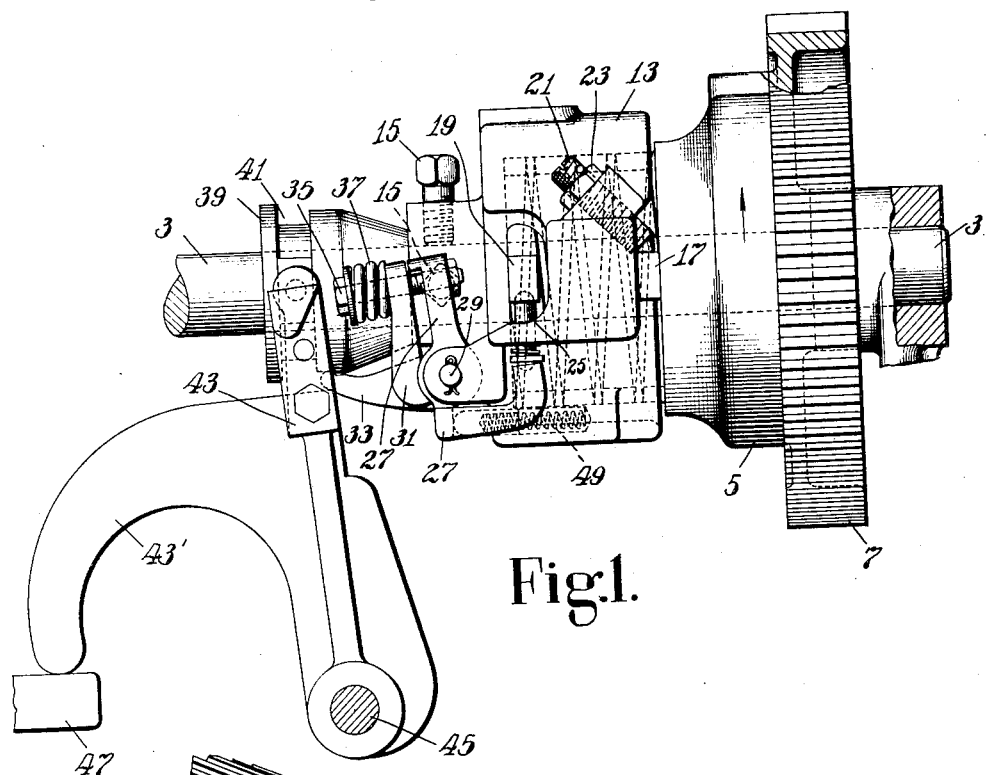
Figure 2:
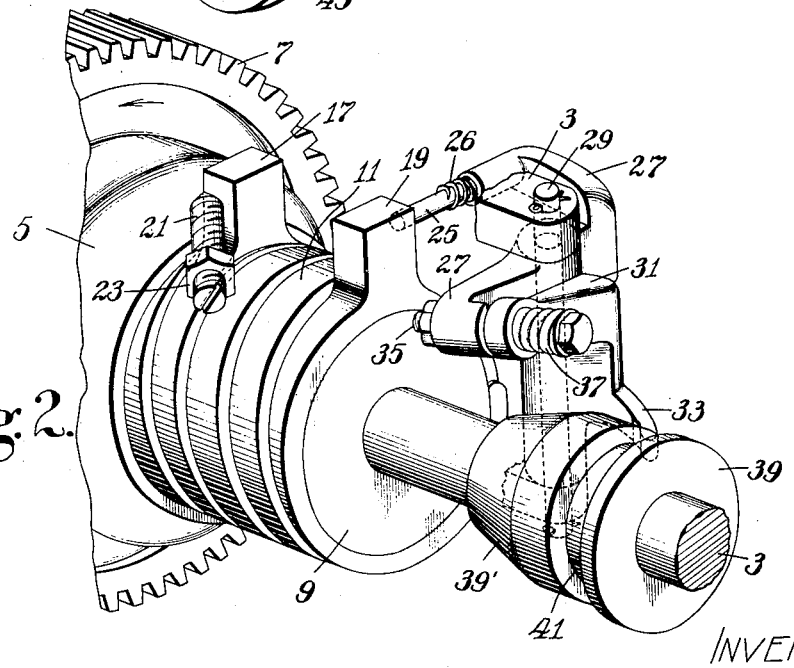

Referring now to the accompanying drawing,

Fig. 1 is an elevation of a clutch in which the present invention is embodied; and Fig. 2 is a perspective of certain portions of the clutch.

Rotatably mounted on the shaft 3 and held from longitudinal movement with respect thereto is a driving member 5 having formed upon it a gear 7 by which it may be rotated continuously, said driving member having a hub 9 which is encircled by a contractible coil 11 of spring steel. A driven member 13 has a cup-shaped portion extending over the coil and a hub which is fastened to the shaft by set screws 15. Integral with the coil are two lugs 17, 19, one located near one end of the coil and the other located near the other end, the member 13 being formed with a suitable hollow boss to receive the lugs loosely so that they may be moved circumferentially of the hub 9. Threaded through a lug on the member 13 is a screw 21 which serves as a stop to prevent circumferential movement of the lug 17 in one direction. The axis of this screw is oblique to the axis of the lug, and the conical end of the screw engages a flat face on the lug so that by turning the screw the coil may be adjusted into different angular positions about the hub, a check-nut 23 being provided to hold the screw in adjusted position. The purpose of this adjustment is to vary the extent to which the coil will be contracted about the hub 9 when pressure is applied to the other lug 19 in a manner presently to be described.

This other lug is engaged by one end of a small pin 25 which is slidable in a bore in the driven member 13, the other end of the pin being held by a small spring 26 in contact with the operative end of a two-armed lever 27 pivoted about a pin 29 carried by the driven member 13. Consequently, when this lever is rocked in a counterclockwise direction, as viewed in Fig. 1, the coil is contracted about the hub of the driving member 5 and the shaft 3 is rotated. This rocking movement is accomplished yieldingly by means of a second two-armed lever also pivoted about the pin 29 and having two arms 31, 33 said two-armed lever serving as an actuator for the two-armed lever 27. Fastened to the upper end of one arm of the two-armed lever 27 is a bolt 35, the stem of this bolt passing loosely through a bore in the outer end of the arm 31 of the other lever. A comparatively heavy coiled spring 37 encircles the stem of the bolt 35 between the head of the bolt and one face of the arm 31. When, now, the arm 33 is rocked away from the shaft 3, the arm 31, through the spring 37 and bolt 35 rocks the two-armed lever 27 to force the pin 25 against the lug 19 and thereby to contract the coil 11 about the hub 9, the parts being shown in these positions in the figures.

In order to actuate the arm 33, a spool 39, which is loose on the shaft 3, has a tapered portion 39' to engage the free end of the arm 33 and swing said arm, said spool having a circumferential groove 41 to receive rolls carried in the usual manner by the arms of a shifting fork 43 pivoted about a stationary pivot 45. This shifting fork 43 has an extension 43' adapted to be engaged by the free end of a pivoted treadle 47 or other suitable member.

When the parts are in the positions shown, the treadle is being held depressed about its pivot with its free end raised as shown, and the clutch is engaged. When the treadle is released, the weight of the extension 43' swings the shifting fork 43 to the left, as viewed in Fig. 1, to slide the spool 39 to the left and thereby disengage the clutch. In order to hold the free end of the arm 33 at all times in engagement with the spool 39, a small compression spring 49 bears with one end against the bottom of a socket in the driven member 13 and with the other against the bottom of an alined socket in the two-armed lever 27.

It should be particularly noted that the force which is applied to the lug 19 to contract the coil is a yielding one due to the presence of the spring 37 and that the screw 21 provides means for adjusting the coil circumferentially of the hub 9. This coiled spring is of such strength that when the two-armed lever 31, 33 is swung through its path of fixed extent into the position shown, the spring 37 is compressed very slightly, if at all, and the coil 11 is contracted just enough to engage the hub 9 firmly. The adjustment of the parts to secure this desirable result in the first instance is made by turning the adjusting screw 21 which locates the coil circumferentially of the hub and by turning the screw 35 which changes the relation between the two two-armed levers. It is very desirable that the compression of the spring 37 in the position of parts shown should always be substantially the same so that, on the one hand, the coil 11 will engage the hub firmly and, on the other hand, the coil will not be contracted enough to cause it to break. When the friction between the coil and the hub wears these parts so that the clutch does not hold properly, the adjusting screw 21 is turned so that the tension of the spring 37 in the position of parts shown will remain substantially as it was before the wear took place.

Although the invention has been set forth as embodied in a particular device it should be understood that the invention is not limited in the scope of its application to the particular device which has been shown and described.

Having thus described my invention, what I claim as new and desire to secure by Letters Patent of the United States is:

1. A device of the class described having, in combination, a shaft, a driving member loose thereon and provided with a hub, a contractible coil encircling the hub and provided with two lugs spaced from each other along the coil, a cup-shaped member extending over the coil and fast to the shaft, an adjusting screw carried by the cup-shaped member and engaging one lug on the coil, a two-armed lever pivoted on the cup-shaped member, a pin located between the end of one arm of the lever and the other lug on the coil, and yielding means engaging the other arm of the lever for swinging said lever about its pivot to contract the coil about the hub.

2. A device of the class described having, in combination, a shaft, a driving member loose thereon and provided with a hub, a contractible coil encircling the hub and provided with two lugs spaced from each other along the coil, an adjusting screw in contact with one lug, a movable member in contact with the other lug, an actuator for said member, means for moving said actuator in a path of fixed extent, an adjustable yielding connection between the actuator and the member, and operator-controlled means for moving the actuator.

3. A device of the class described having, in combination, a shaft, a driving member loose thereon and provided with a hub, a contractible coil encircling the hub and provided with two lugs spaced from each other along the coil, a member extending over the coil and fast to the shaft, an adjusting screw carried by the member and engaging one lug on the coil, a lever pivoted on the member and adapted when swung about its pivot to contract the coil, an actuator also pivoted on the member, and a yielding adjustable connection between the actuator and the lever.

4. A device of the class described having, in combination, a shaft, a driving member loose thereon and provided with a hub, a contractible coil encircling the hub and provided with two lugs spaced from each other along the coil, a cup-shaped member extending over the coil and fast to the shaft, an adjusting screw carried by the cup-shaped member and engaging one lug on the coil, a two-armed lever, a pivot carried by the cup-shaped member upon which the lever is mounted, a pin located between the end of one arm of the lever and the other lug on the coil, and means for swinging the lever about the pivot to contract the coil about the hub, said means comprising a second two-armed lever mounted on the same pivot upon which the first-named lever is mounted, a yielding connection between an arm of one lever and an arm of the other lever, and means for engaging the free arm of the second-named lever to swing it about the pivot.

OSCAR L. LAWSON.